United States Patent [19]

McKay et al.

[11] Patent Number: 4,800,862

[45] Date of Patent: Jan. 31, 1989

[54] CONTROL OF FUELLING RATE FOR INTERNAL COMBUSTION ENGINES

[75] Inventors: Michael L. McKay; Mark R. Lear, both of Western Australia, Australia

[73] Assignee: Orbital Engine Company Proprietary Limited, Balcatta, Australia

[21] Appl. No.: 915,670

[22] Filed: Oct. 6, 1986

[30] Foreign Application Priority Data

Oct. 7, 1985 [AU] Australia .............................. PH02782

[51] Int. Cl.[4] ............................................. F02M 67/02
[52] U.S. Cl. ..................................... 123/531; 123/73 C
[58] Field of Search .............. 123/531, 533, 535, 73 C

[56] References Cited

U.S. PATENT DOCUMENTS

| | | | |
|---|---|---|---|
| 1,208,686 | 12/1916 | Steinbecker ......................... | 123/531 |
| 2,146,265 | 2/1939 | Moore, Jr. ......................... | 123/531 X |
| 3,610,213 | 10/1971 | Gianini ................................. | 123/531 |
| 3,970,063 | 7/1976 | Mayr et al. ....................... | 123/531 X |
| 3,987,771 | 10/1976 | Oglesby .......................... | 123/531 X |
| 4,519,356 | 5/1985 | Sarich .............................. | 123/531 X |
| 4,554,945 | 11/1985 | McKay ................................ | 123/531 |
| 4,627,390 | 12/1986 | Antoine ........................... | 123/531 X |

Primary Examiner—Willis R. Wolfe, Jr.
Attorney, Agent, or Firm—Armstrong, Nikaido, Marmelstein & Kubovcik

[57] ABSTRACT

A method of injecting fuel to an internal combustion engine (9) comprising introducing a metered quantity of fuel into a scheduling chamber (32) from where it is injected by pressurized gas into the combustion chamber or induction system of the engine (9). The rate and/or time of introduction of the fuel to the scheduling chamber (32) is controlled in relation to the period of injection to achieve a predetermined fuel distribution in the combustion chamber at ignition. An axial stratification of fuel in the combustion chamber can be produced.

23 Claims, 5 Drawing Sheets

Degrees after top dead centre [°ATDC]

CONTROL OF FUELLING RATE FOR INTERNAL COMBUSTION ENGINES

This invention is directed to the delivery of fuel to the combustion chamber of an internal combustion engine.

Fuel injection systems have been proposed wherein fuel is injected to an engine combustion chamber or air induction system by a compressed gas. An example of such systems is described in our U.S. patent application Ser. No. 740,067, filed Apr. 2, 1986, now U.S. Pat. No. 4,693,224. In that example fuel is supplied to what may be termed a scheduling chamber which is pressurized by a gas, preferably air, and the scheduling chamber is selectively communicated with a combustion chamber or air induction system by the opening of an injection nozzle. The fuel is projected as a fuel-gas mixture spray through the nozzle into the combustion chamber, or the air flow to the combustion chamber.

In the previously described systems the rate of flow of fuel, also termed the fuel flux, through the injection nozzle is controlled by the flow area of the injection nozzle, the pressure drop across the nozzle, and the ratio of fuel to air in the mixture being propelled from the nozzle.

In the case of the injection system described in the above patent application, the rate of flow of fuel through the injection nozzle rises rapidly as the injection nozzle opens, remains generally steady until the metered amount of fuel is largely expelled from the scheduling chamber, and then drops as the scheduling chamber is stripped of fuel.

In the efforts to control the harmful components in the exhaust gases from engines, it has been found that control of the fuel distribution in the combustion chamber can be beneficial. One method proposed to achieve this control is to provide flow directors in association with the inlet port of the cylinder to thereby induce the desired gas flow in the cylinder, into which the fuel is injected. The provision of flow directors in the inlet port naturally constitutes an obstruction to the air flow and as a consequence is detrimental to volumetric efficiency. In addition flow directors give rise to difficulties and additional costs in manufacture.

There have been previous proposals to operate internal combustion engines with multiple fuel deliveries per cycle, with the view to obtaining a degree of fuel stratification in the axial direction of the combustion chamber. One proposal is found in U.S. Pat. No. 3,154,059 by Witzky et al which discloses a four stroke cycle engine wherein respective injectors are provided to deliver metered quantities of fuel to the air induction system and directly into the combustion chamber. In addition it is proposed to divide the direct injection to the combustion chamber into two or more pulses. However this proposal requires a swirling motion to also be induced in the gas charge in the combustion chamber as a major contribution to the fuel stratification. Also the liquid fuel is delivered as a single fluid to the combustion chamber by the direct injector, the fuel not being entrained in a gas, and relies on a resonant condition in the liquid fuel line to establish the multiple fuel pulses.

Another proposal is found in U.S. Pat. No. 4,446,830 Simko, wherein two distant injections of fuel are effected each engine cycle, one injection occuring near the start of the induction stroke and the second shortly before the end of the compression stroke. This proposal is specifically directed to engines operating with high latent heat fuels such as methanol, the majority of which is injected at the start of the induction stroke to provide sufficient heat and time to vapourise the fuel before ignition. The second injection is to provide the fuel rich mixture at the spark plug at the time of ignition.

Other prior U.S. patents relating to multiple fuel injection per engine cycle known but considered not to be directly relevant to this invention are:
LLoyd, U.S. Pat. No. 4,187,825,
Eckert, U.S. Pat. No. 4,022,165,
Araya et al., U.S. Pat. No. 3,722,490,
Eyzat, U.S. Pat. No. 3,216,407 and U.S. Pat. No. 3,439,655.

It is the object of the present invention to provide a method of delivering fuel to an engine to control the fuel distribution in the engine combustion chamber to improve combustion efficiency.

With this object in view there is provided a method of delivering fuel to an engine comprising introducing a metered quantity of fuel into a body of gas to provide a fuel-gas mixture, delivering said fuel-gas mixture to the engine in timed relation to the engine cycle, and controlling the introduction of the fuel to the gas to obtain a predetermined fuel distribution in the combustion chamber of the engine at ignition.

Preferably the predetermined fuel distribution includes a fuel rich mixture in that portion of the combustion chamber where ignition of the charge is initiated. Conveniently the fuel distribution is such that the combustion charge is fuel rich at the cylinder head end of the combustion chamber and decreases in fuel density as the distance from the cylinder head increases. This distribution may be considered as axial fuel stratification in the combustion chamber.

The control of the rate of introduction of the fuel into the gas which conveys the fuel to the engine, both prior to and/or during admission of the fuel-gas mixture to the engine, may be used to obtain the required fuel distribution in the engine combustion chamber. In one embodiment the fuel is introduced into a scheduling chamber charged with air, the scheduling chamber being selectively communicable with the induction manifold or combustion chamber of the engine. Part of the total metered quantity of fuel may be introduced to the scheduling chamber prior to establishing communication of the scheduling chamber with the induction manifold or combustion chamber, and the remainder of the fuel introduced to the scheduling chamber over a selected portion of the period during which communication exists between the scheduling chamber and the combustion chamber or induction manifold.

The quantity of fuel introduced during the respective periods may be adjusted to achieve the required fuel distribution in the combustion chamber at the time of ignition. In particular, the introduction of fuel to the scheduling chamber after commencement of delivery therefrom is a convenient control sequence to provide a fuel rich mixture adjacent the cylinder head where ignition occurs.

An alternative means of controlling the fuel distribution in the combustion chamber is to modulate the pressure differential across the port through which the fuel-air mixture is delivered to the combustion chamber or manifold, and so control the velocity, and hence the degree of penetration, of the fuel-gas mixture.

It will be appreciated that both of the above discussed specific modes of controlling fuel distribution in the combustion chamber may be combined to achieve the required fuel distribution.

There is also provided by the present invention a method of injecting fuel to the combustion chamber or air induction system of an internal combustion engine comprising introducing a metered quantity of fuel into a scheduling chamber, selectively communicating the scheduling chamber with the combustion chamber or air induction system in timed relation to the engine cycle, supplying air to the scheduling chamber at a pressure above the pressure in the combustion chamber or air inducting system during said communication, to inject a fuel-air mixture, and controlling the rate and/or time of introduction of the fuel to the scheduling chamber in relation to the period of communication of the scheduling chamber with the combustion chamber or induction system to achieve a predetermined fuel distribution in the combustion chamber at ignition.

Conveniently the control is arranged so that fuelling rate during the later part of the injection into the combustion chamber or air induction system is increased. In this way a fuel rich combustion mixture can be located adjacent the point of ignition to provide ease of ignition. This increased fuelling rate may be in contrast to a generally steady fuelling rate during the whole of the earlier part of the injection of the fuel. Alternatively there may be a decline in the fuelling rate during the earlier part of the fuel injection followed by an increase from said declined rate at the later part of the fuel injection. Preferably the fuel/gas ratio of fuel-gas mixture during the latter part of delivery to the engine is not less than the ratio during the remainder of the delivery.

It is to be understood that the total quantity of fuel delivered to the engine per cycle is determined in accordance with the engine load and speed and the present invention does not propose a departure from this determined quantity. The present invention controls the rate of introduction of the determined quantities of fuel to the engine combustion chamber to obtain the efficient distribution of the fuel within the combustion chamber. Arising from the effective fuel distribution greater fuel economy may result; however the major advantage is the reduction of undesirable contaminants in the engine exhaust gas.

In this regard it is to be understood that the optimum fuel distribution in the combustion chamber will vary with engine operating conditions. In particular it is more important to have a non-uniform fuel distribution at low loads where the distribution should be restricted to provide a readily ignitable mixture, preferably richer than a stoichometric mixture, at the point of ignition. At high engine loads it is important to more evenly distribute the fuel throughout the gas charge in the combustion chamber, to expose the fuel to sufficient oxidant to combust all of the fuel. Accordingly the controlling of the fuel distribution to achieve a non-uniform fuel distribution may not be effected over the complete load range of the engine, but is preferably effected over at least the low load range of the engines operation.

Low and high loads are relative terms that will be generally understood by the skilled person. However, as a general guide, in the context of modern automotive engines high loads can be considered as those greater than 75% of the maximum load attainable at the particular engine speed, and low loads are those less than 25% of the maximum load of that particular speed.

The invention will be more readily understood from the following description of one practical arrangement of the fuel injection method and apparatus for carrying out the method.

Figure 1:
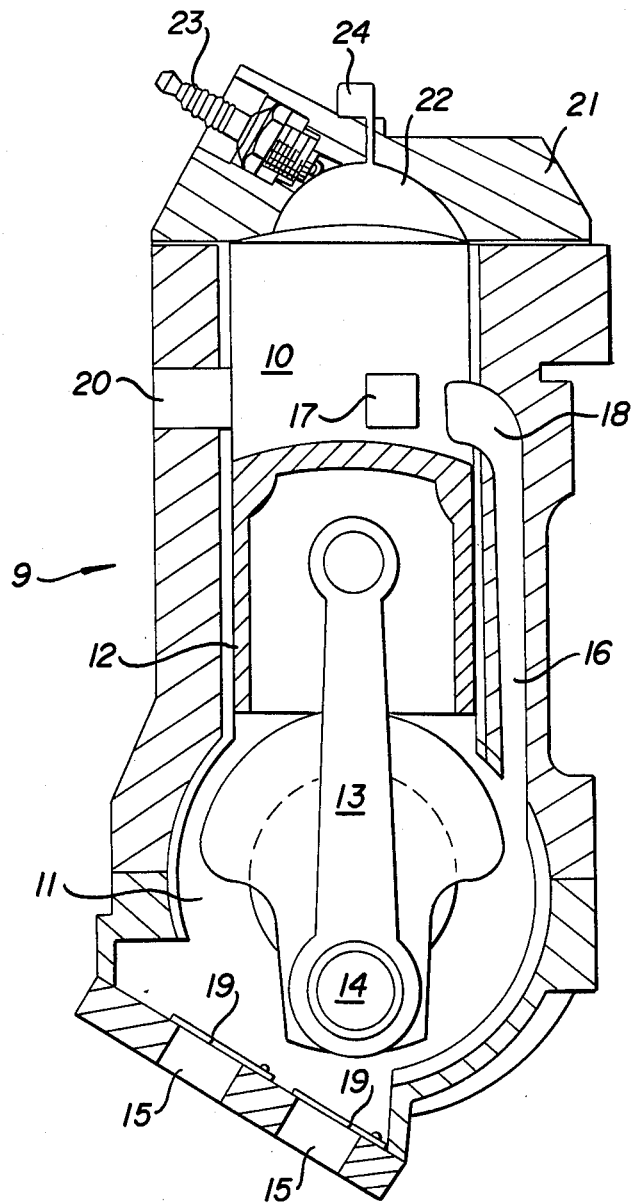
FIG. 1 shows a portion of an engine utilising the invention.

Referring now to FIG. 1 the engine 9 is a single cylinder two stroke cycle engine, of generally conventional construction, having a cylinder 10, crankcase 11 and piston 12 that reciprocates in the cylinder 10. The piston 12 is coupled by the connected rod 13 to the crankshaft 14. The crankcase is provided with air induction ports 15, incorporating conventional reed valves 19, and three transfer passages 16 (only one shown) communicate the crankcase with respective transfer ports, two of which are shown at 17 and 18, the third being the equivalent to 17 on the opposite side of port 18.

The transfer ports are each formed in the wall of the cylinder 10 with their respective upper edge located in substantially the same diametral plane of the cylinder. An exhaust port 20 is formed in the wall of the cylinder generally opposite the central transfer port 18. The upper edge of the exhaust port is slightly above the diametral plane of the transfer ports' upper edges, and will accordingly close later in the engine cycle.

The detachable cylinder head 21 has a combustion cavity 22 into which the spark plug 23 and fuel injector nozzle 24 project. The cavity 22 is located substantially symmetrically with respect to the axial plane of the cylinder extending through the centre of the transfer port 18 and exhaust port 20. The cavity 22 extends across the cylinder from the cylinder wall immediately above the transfer port 18 to a distance past the cylinder centre line.

The injector nozzle 24 is located at the deepest part of the cavity 22, while the spark plug 23 projects into the cavity 22 at the face of the cavity remote from the transfer port 18. Accordingly the air charge entering the cylinder will pass along the cavity past the injector nozzle 24 toward the spark plug and so carries the fuel from the nozzle to the spark plug.

Further details of the form of the cavity 22 and of the combustion process derived therefor are disclosed in U.S. patent application No. 866,427 lodged on the May 23, 1986, now U.S. Pat. No. 4,719,880, the disclosure of which is hereby incorporated herein by this reference.

Figure 2:
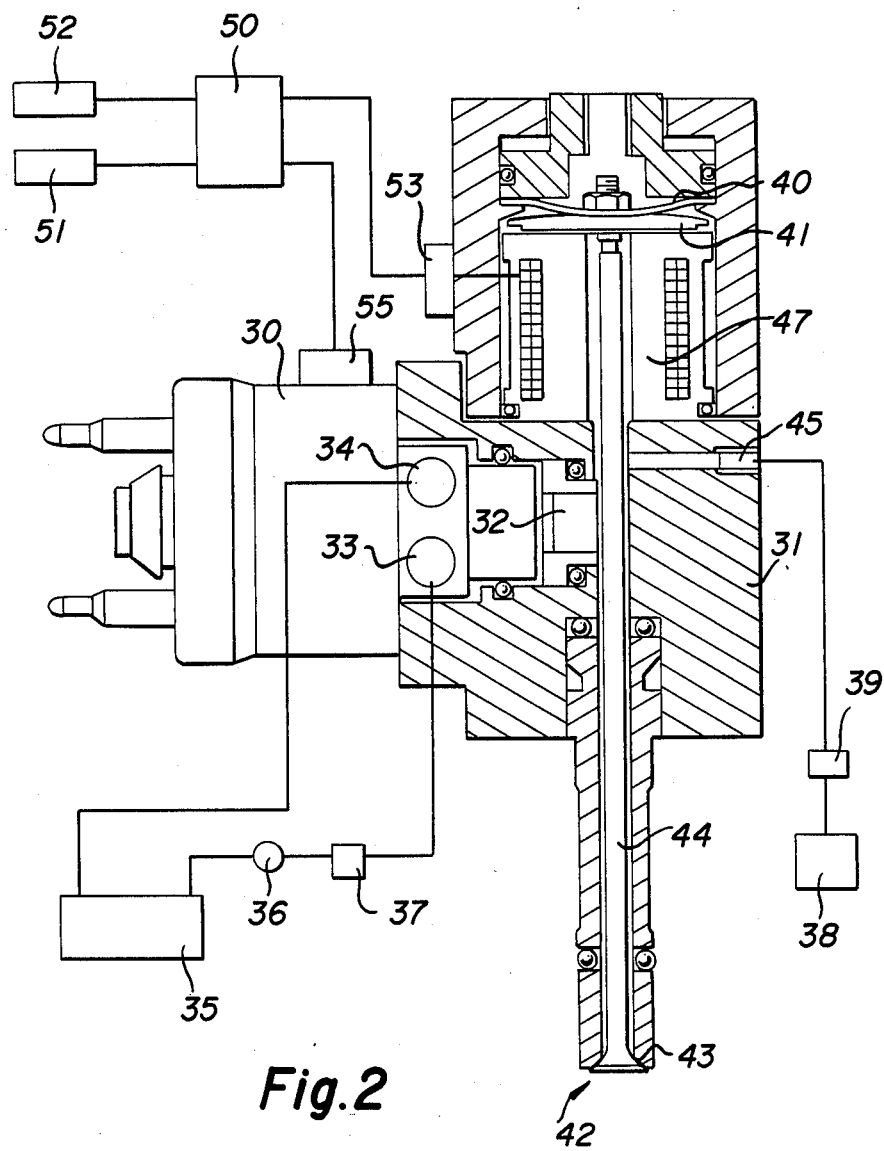
FIG. 2 shows a fuel injector utilised in the engine shown in FIG. 1.

The injector nozzle 24 is an integral part of the fuel metering and injection system wherein the fuel is entrained in air and delivered to the combustion chamber of the engine by the pressure of the air supply. One particular form of such a fuel metering and injection unit is illustrated in FIG. 2 of the drawings.

The fuel metering and injection unit incorporates a suitable commercially available metering device 30, such as an automotive type throttle body injector, coupled to an injector body 31 having a holding or scheduling chamber 32 therein. Fuel is drawn from the fuel reservoir 35 by the fuel pump 36 and delivered via the fuel pressure regulator 37 through fuel inlet port 33 to the metering device 30. The metering device operating in a known manner meters an amount of fuel into the chamber 32 in accordance with the engine fuel demand. Excess fuel supplied to the metering device is returned to the fuel reservoir 35 via the fuel return port 34. The particular construction of the fuel metering device 30 is not critical to the present invention and any suitable device may be used.

In operation, the scheduling chamber 32 is maintained at a selected pressure supplied from the air source 38 via air pressure regulator 39 to air inlet port 45 in the body 31. Delivery of the fuel into the chamber 32 is effected against the pressure of the air therein, and accordingly the pressure differential between the fuel and air is relevant to the rate of delivery of the fuel into the chamber. Injector valve 43 is actuated to permit the pressure of the air in the chamber 32 to discharge the fuel through injector nozzle 42 into a combustion chamber of the engine. Injector valve 43 is of the poppet valve construction opening inwardly to the combustion chamber, that is, outwardly from the sequencing chamber 32.

The injector valve 43 is coupled, via a valve stem 44, which passes through the chamber 32, to the armature 41 of solenoid 47 located within the injector body 31. The valve 43 is biased to the closed position by the disc spring 40, and is opened by energising the solenoid 47.

Further details of the operation of this fuel injection system are disclosed in U.S. patent application No. 740,067 filed Apr. 2, 1985, now U.S. Pat. No. 4,693,224, the disclosure of which is incorporated herein by reference.

The energising of the solenoid 47 is timed in relation to the engine cycle by a suitable electronic processor 50. The processor receives an input signal from the speed sensor 51 which signal is indicative of the engine speed and also identifies a reference point in the engine cycle in respect of which operations may be timed in relation to the engine cycle. The processor 50 also receives a signal from the load sensor 52 indicative of the air flow rate in the engine air induction system which is directly related to engine load. The processor is programmed to determine from the air flow rate signal the load demand on the engine, and hence the required quantity of fuel to be delivered by the metering device 30 into the chamber 32.

The processor 50 is further programmed to determine from the speed and load conditions of the engine the required timing of the injection of the fuel into the combustion chamber. Conveniently the processor incorporates multi-point maps designating the required injection timing for a range of engine loads and speeds, these having been determined from tests carried out to obtain required engine power and exhaust emission levels.

The processor 50 provides appropriate signals to the actuator 55 of the fuel metering device 30, and to the injector actuator 53 that controls the energising of the solenoid 47, in accordance with the processor's determinations, to effect metering of the required amount of fuel into the chamber 32 and to energise the solenoid 47 at the required time in the engine cycle for injection of the fuel into the combustion chamber. The general construction of the load and speed sensors suitable for use as above indicated are well known in the industry, as are processors for performing the functions required by the processor 50.

It will be understood that the timing of ignition of the fuel will preferably be varied as the timing of injection of the fuel is varied, and this may also be controlled by the processor 50. The principle of variation of ignition timing with injection timing is well known and practised in the field of fuel injected engines and is not further discussed herein in detail.

As previously referred to the pressure of the air supply to the chamber 32 is controlled by the air pressure regulator 39, and the pressure of the fuel supply to the metering unit 30 is controlled by the fuel pressure regulator 37. As the pressure differential between those fuel and air supplies is related to the metering function of the metering unit 30, it is desirable that this differential be maintained constant. Accordingly it is proposed that the fuel supply pressure be regulated relative to atmospheric pressure, and the air supply pressure be regulated with respect to the fuel pressure to thereby maintain the required pressure differential between the fuel and air supplies independently of the fuel pressure.

An integrated fuel and air pressure regulator that will regulate the fuel and air pressures in the above proposed manner is disclosed in U.S. patent application Ser. No. 051,463, filed Mar. 11, 1987, still pending. The disclosure in this application is hereby incorporated in this specification by reference. The regulator disclosed in the application just referred to incorporates provision for varying the fuel regulated pressure in response to a selected engine operating condition, and this feature may be used in the practice of the present invention. It is to be noted that as the air pressure is regulated with respect to the fuel pressure, any variation in the regulated fuel pressure will not affect the fuel-air pressure differential and hence the fuel metering.

An increase in the air pressure, resulting from an increase in fuel pressure, will increase the mass of air delivered with the fuel to the combustion chamber, in a fixed time interval. Thus at high engine loads the air available to deliver the fuel may be increased by increasing the air pressure while maintaining the same injection period, and without necessitating adjustment to the fuel metering function. Also an increase in the air pressure will increase the degree of penetration of the fuel into the engine combustion chamber which is desirable at high engine loads.

In the previously discussed fuel metering and injection equipment, the total metered quantity of fuel, as determined by the processor 50 to be required per engine cycle to meet the engine load demand, is delivered into the chamber 32 prior to the opening of the valve 43. Accordingly the metered quantity of fuel is entrained in the generally stationary mass of air within the chamber 32. Upon opening of the valve 43 the air in the chamber 32 and the fuel entrained therein is displaced through the valve 43 into the cavity 22 in the engine cylinder head. As the quantity of air delivered through the valve 43 while open is greater than that quantity of air initially within the chamber 32, the air delivered immediately after opening of the valve will be richer in fuel than that later delivered air.

Figure 3:
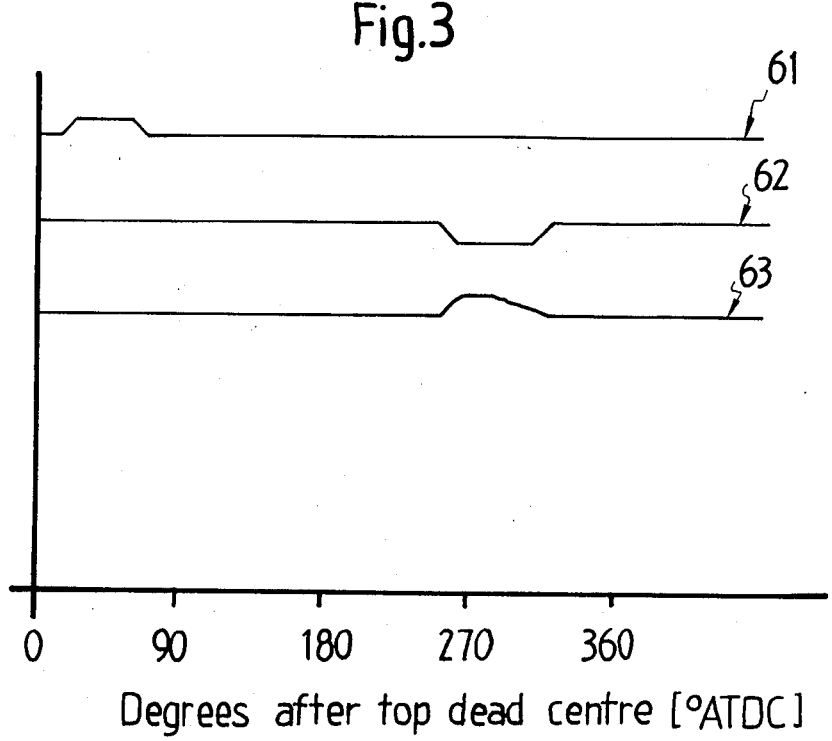
FIG. 3 shows graphically injector valve positions and fluid flow rates against engine crank angle when the injector is operated in a prior art mode.

This mode of operation is graphically illustrated in FIG. 3 of the drawings, being the prior art mode of operation. FIG. 3 plots against crank angle measured after piston top dead centre position (ATDC), fuel delivery to the chamber 32, plot 61, valve 43 position, plot 62, and rate of fuel delivery to the combustion chamber 32, plot 63. These plots are for the engine operating at a fixed speed in the medium area of the engine speed range.

As seen from plot 61 the metering device 20 commences to introduce fuel into the scheduling chamber 22 at about 15° After Top Dead Centre (ATDC) and finishes at about 70° ATDC, the rate of delivery being substantially uniform over this period. Plot 62 shows that the injection valve 33 commences opening at about 250° ATDC, is fully opened by about 260° ATDC, commences closing at about 305° ATDC and completely closes at about 320° ATDC. The rate of fuel flow through injection valve 33 into the combustion chamber as shown by plot 63, rises rapidly as the injection valve opens, remains generally steady for about 20° of crank rotation, and then progressively reduces as the quantity of fuel in the scheduling chamber 32 decreases until substantially only air remains to pass into the combustion chamber. It will be appreciated that the above described time relationship between fuel metering and fuel injection will result in a relatively large proportion of the metered quantity of fuel being delivered early in the injection period which would tend to lead to a relatively fuel lean mixture being delivered at the end of the injection period.

It will further be appreciated that the fuel injected early will penetrate and/or be mixed further into the combustion chamber than the later injected fuel. Accordingly use of the prior art injection mode (as represented by FIG. 3) when a low fuelling rate is required (at low engine loads) results in a relatively lean mixture in the immediate vicinity of the spark plug and hence poor ignitability. This condition contributes to increased unburnt fuel in the exhaust gases which in turn produces increased fuel consumption and hydrocarbon (HC) emissions.

Figure 4:
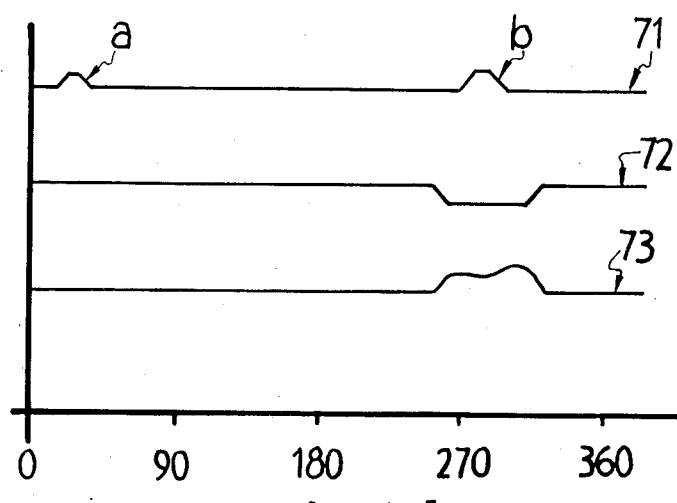
FIG. 4 shows injector valve positions and fluid flow rates against crank angle when the injector is operated in a mode according to the present invention.

One mode of operation of the fuel injector in accordance with the present invention is illustrated by FIG. 4, in a similar fashion to FIG. 3. Plot 71 shows the flow of fuel from the metering device 30 into the scheduling chamber 32. Plot 72 shows the position of injection valve 43, and plot 73 shows the rate of fuel flow through the injection valve 43. The metering device 30 introduces fuel into the scheduling chamber 32 from 15° ATDC to 40° ATDC and again in a second metering period from 270° to 300° ATDC. The injection valve 43 opens and closes at the same timing as in plot 61 in FIG. 3. The rate of fuel flow through injection valve 43 rises as the injection valve initially opens, and commences to decrease as the fuel previously metered into the scheduling chamber 32 during the period from 15° to 40° ATDC is used up. However at 270° ATDC the second metering period commences as further fuel enters the scheduling chamber 32 increasing the fuel delivery rate to the engine during the secondary fuelling period. Thereafter the fuel delivery rate again decreases as the quantity of fuel in the scheduling chamber 22 is exhausted.

The redistribution in the fuel flow rates, provided by the present invention as illustrated in FIG. 4, thus provides an avenue for the production of a richer fuel-air mixture around the region of the spark plug, than would otherwise have been available. This is achieved without an increase in the total metered quantity of fuel per cycle, and without effecting two or more separate injections of fuel within the one engine cycle. This richer mixture is located high in the combustion chamber, in comparison with the region adjacent the piston, and so provides a readily combustible mixture at the spark plug, and also a stratification of the fuel in the direction of the axis of the cylindrical combustion chamber. The stratified form of the fuel distribution provides improved combustion conditions, particularly under low loads, with improved fuel consumption and reduced exhaust emissions, particularly HC.

The control of the timing of the introduction of the fuel into the chamber 32 can readily be achieved by suitable programming of the electronic processor controlling the fuel metering unit 30. The particular metering unit previously referred to, like a large number of fuel metering devices in current use in fuel injection systems, has a solenoid operated metering valve. When energised, the solenoid opens the valve to permit fuel to flow into the chamber 32 and so, by controlling the period of energisation of the solenoid, and the time relation thereof to the operating of the injection valve 43, it is possible to deliver the fuel to the chamber 32 in the mode as illustrated in FIG. 4 or any similar divided delivery.

It will be appreciated that the processor 50 responds to the signal, indicating the engine load condition, to determine the required total fuel quantity to be supplied to the chamber 32 each injection cycle. The processor in order to carry out the present invention, then divides that determined fuel quantity into the two components represented by "a" and "b" in FIG. 4 and energises the solenoid of the metering device 30 for the respective periods of time, and at the required times in the engine cycle. In this manner the predetermined fuel distribution in the cylinder is obtained.

The processor may be arranged to divide the determined fuel quantity into two or more components in a fixed ratio, independent of engine load or speed, or may be arranged to vary the ratio in response to engine load and/or speed. In this regard the processor may be arranged to only divide the fuel quantity into components when the engine is operating within a selected load and/or speed range, such as the low load range. Also similarly the processor may be arranged to vary the timing of the delivery of the respective components of the fuel quantity, both in regard to the time intervals between the delivery of the respective components and their timing with relation to the engine cycle and/or injection cycle.

In the previous discussion with respect to FIGS. 1 to 4, the present invention has been in the form of controlling direct injection of the fuel into the combustion chamber of the engine. However, as indicated in the early part of this specification, the invention is also applicable to the injection of fuel into the air induction system of an engine. This is particularly applicable to engines operating on the four stroke cycle, and it has been noted that in a four stroke cycle engine similar improvements in engine performance are obtained by the application of the present invention to deliver the fuel into the air induction system close to the inlet valves or directly into the combustion chamber.

In applying the invention to injection of fuel into the air induction system the fuel metering and scheduling equipment as described with reference to FIG. 2 may be used to meter the required quantity of fuel in accordance with the engine demand, and schedule the timing and the rate of the delivery of the fuel into the induction manifold.

It will be appreciated that by appropriate programming of the processor the fuel delivery timing and rate to the induction manifold may be arranged to obtain the required fuel distribution in the engine combustion chamber at the time of ignition. At least under low load conditions this distribution is preferably a richer fuel charge near the ignition point (axially near the cylinder head) relative to the rest of the fuel charge (axially spaced from the cylinder head). Thus again an axially stratified fuel charge is provided in the cylinder.

Comparative tests have been carried out using one cylinder for a four stroke four cylinder engine having an engine capacity of 1.6 liters, and known as the "Kent" engine, manufactured by Ford in Great Britain.

In one test a comparison was made between the direct injection of fuel into the cylinder using an injector of the type shown in FIG. 2 and a single fluid injector known as the L-JETRONIC (Trade Mark) type injector as manufactured by Bosch GMBH.

Figure 5:
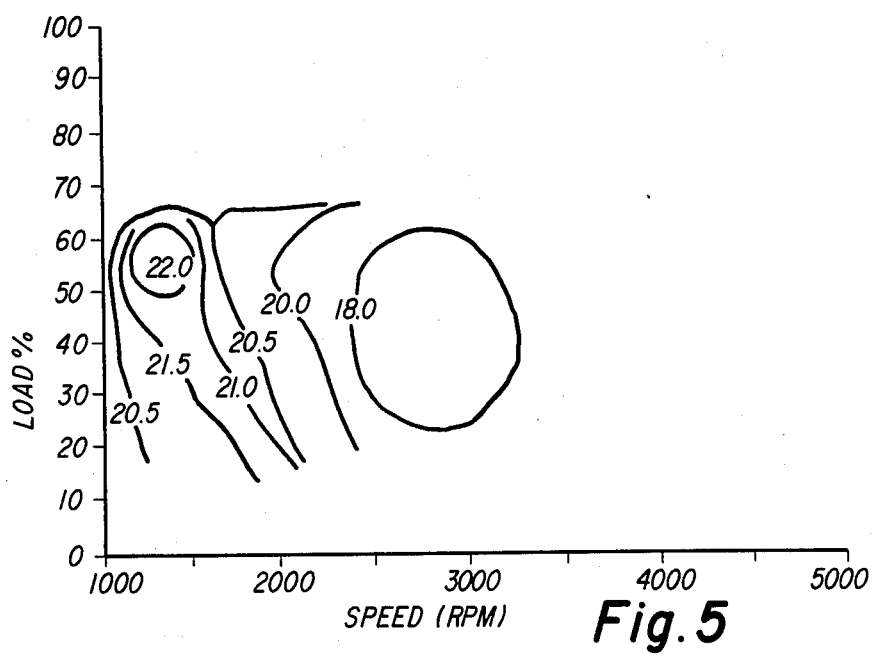
FIGS. 5 to 10 show comparative performance characteristics of present invention against the prior art.
Figure 6:
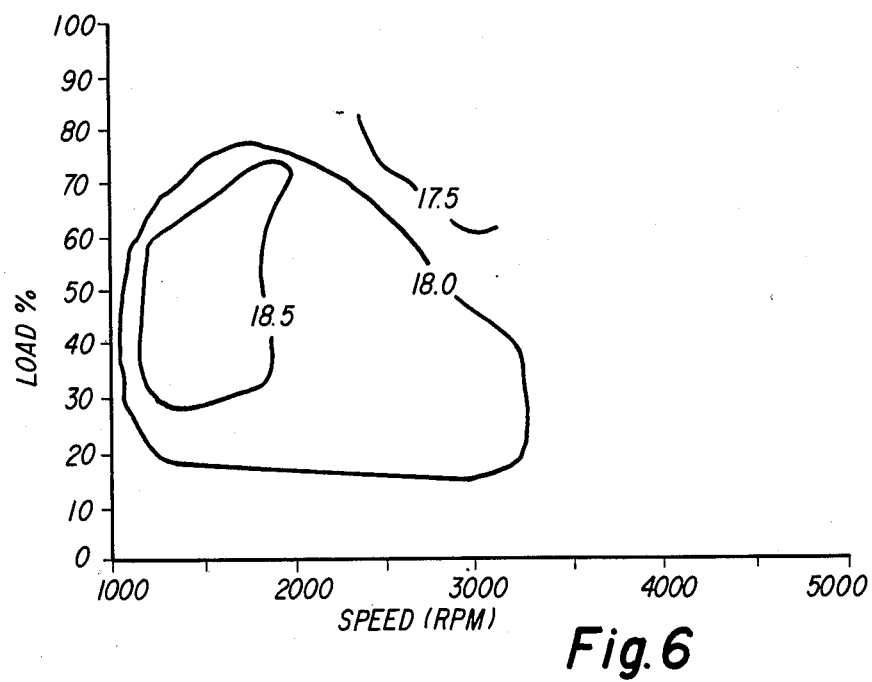

The air-fuel ratio maps obtained from these tests are shown in FIGS. 5 and 6; FIG. 5 being the air-fuel ratio map obtained by operating the injector in FIG. 2 in accordance with the present invention, and FIG. 6 that obtained using the Bosch injector system. It can be clearly seen that the present invention allowed the use of substantially higher air-fuel ratios than the Bosch injector system at most loads and speeds, and particularly at low and medium speeds.

Figure 7:
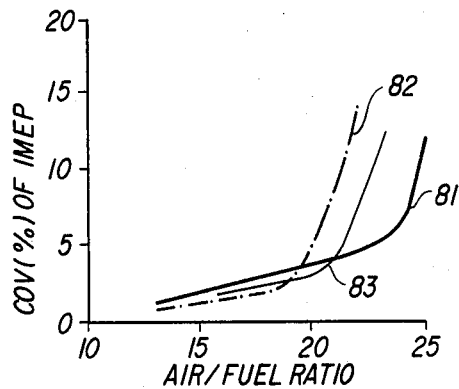

FIG. 7 shows the improved combustion stability achieved with the present invention over the Bosch injector system by the respective plots of percent coefficient of variation of indicated mean effective pressure in the cylinder against air-fuel ratio. Plot 81 represents the stability of the engine using the fuel injector of the type in FIG. 2, and operated in accordance with the present invention as compared with plot 82 obtained with the Bosch injection system. Plot 83 represents the stability of the engine using the fuel injector of FIG. 2 but without controlling the fuel deliveries to the scheduling chamber as proposed by the present invention.

Figure 8:
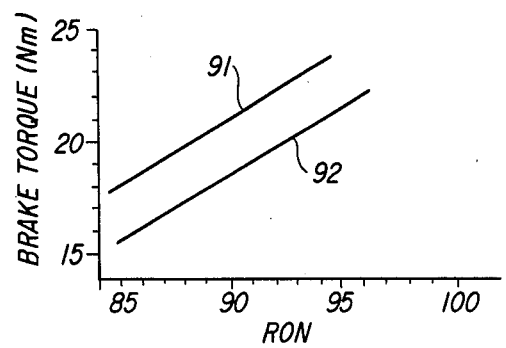

FIG. 8 shows the fuel octane rating requirements of the engine with each of the injection systems. The direct fuel injection system of FIG. 2 permitted the engine to run at lower octane ratings as represented by plot 91 than the Bosch injector system as represented by plot 92. The ability to influence the octane sensitivity of an engine as indicated in FIG. 8 is particularly significant in the transition of the engine from low to high loads.

Figure 9:
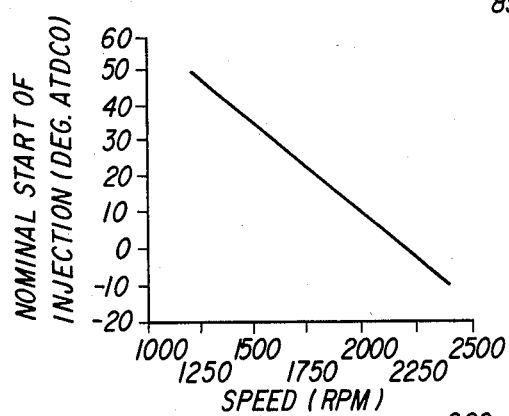
Figure 10:
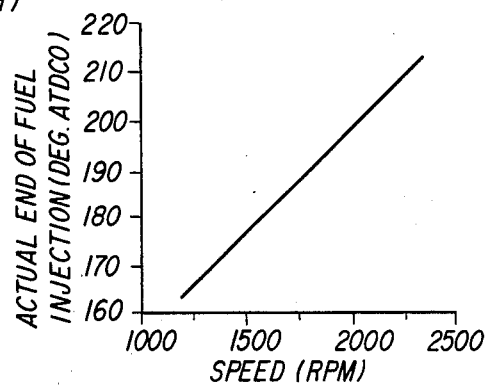

In the tests above referred to in regard to FIGS. 5 to 8, injection of the fuel by the injector as described with reference to FIG. 2 was effected with a fixed injection period of 15 ms. However the timing of the injection in the engine cycle was varied to obtain optimum results. The actual injection timing variation with speed is shown in FIGS. 9 and 10. In this regard it was found that variation of the timing of the injection in relation to the engine cycle has only marginal effect on the performance of the Bosch injection system, and in the above tests injection timing was not varied but set at the generally preferred timing for the engine load and speed range of the test.

The lean combustion condition obtainable with the FIG. 2 fuel injection system, in addition to providing low fuel consumption, provides a reduction in oxides of nitrogen in the exhaust gases. The tests demonstrated that with the FIG. 2 fuel injection system it was possible to calibrate the processor to provide improved fuel economy and lower oxides of nitrogen emissions without a sacrifice in hydrocarbon emission.

For four stroke engines there are substantial similarities in the fuel flux control effects, in relation to axial stratification of the fuel charge, using fuel injection into the air induction system as is achieved with direct injection into the combustion chamber. The same basic metering and injection equipment as previously discussed for use in direct injection may be used to inject into a manifold. The injector nozzle is positioned in the manifold close to the inlet port communicating the manifold with the combustion chamber. In a multi-cylinder engine a separate injector nozzle is provided for each cylinder. The timing of injection is selected so the fuel is delivered to the manifold while the inlet port is open so the fuel is carried immediately into the combustion chamber. It has been found that the fuel distribution established during delivery of the fuel into the air in the induction manifold is substantially maintained to establish a stratified fuel distribution in the combustion chamber, provided there is not extreme turbulence in the combustion chamber. Accordingly increasing the fuelling rate in the air entering the combustion chamber shortly before the inlet port is closed will intensify the fuel stratification gradient in the combustion chamber and thus lean combustion can be extended to higher air-fuel ratios, without loss of combustion stability.

The invention is applicable to internal combustion engines for all uses but is particularly useful in contributing to fuel economy and control of exhaust emissions in engines for vehicles, including automobiles, motor cycles and boats including outboard marine engines.

What is claimed is:

1. A method of delivering fuel to an engine having a combustion chamber in which fuel is ignited and burnt, comprising introducing a metered quantity of fuel into a body of gas to provide a fuel-gas mixture, admitting said fuel-gas mixture to the engine in timed relation to the engine cycle, and, over at least part of the engine load range, controlling during respective engine cycles, the introduction of fuel to the gas as the fuel-gas mixture is delivered to the engine to obtain a predetermined fuel distribution in the combustion chamber at ignition.

2. A method of delivering fuel to an engine as claimed in claim 1, wherein said control is arranged so that over said part of the load range, the fuel-gas ratio of the fuel-gas mixture at the latter portion of the delivery thereof to the combustion chamber is not less than during the remainder of the delivery for the particular engine cycle.

3. A method of delivering fuel to an engine as claimed in claim 1, wherein the metered quantity of fuel is delivered into a scheduling chamber containing gas to form the fuel-gas mixture, a first part of said metered quantity of fuel being delivered into the scheduling chamber prior to commencing delivery of the fuel-gas mixture to the engine, and the balance of the metered quantity of fuel is delivered into the scheduling chamber during delivery of the fuel-gas mixture to the engine.

4. A method of delivering fuel to an engine as claimed in claim 3, wherein the delivery of the fuel-gas mixture to the engine is effected by selectively communicating the scheduling chamber with the engine and maintaining a supply of gas to the chamber during said communication at a pressure sufficient to displace the fuel-gas mixture from the scheduling chamber to the engine.

5. A method as claimed in claims 1, 2, 3 or 4, wherein the fuel-gas mixture is delivered directly into the engine combustion chamber.

6. A method of delivering fuel to a spark ignited internal combustion engine having a combustion chamber comprising, for each fuelling cycle of the combustion chamber, introducing a metered quantity of fuel into a body of gas to provide a fuel-gas mixture, delivering said fuel-gas mixture for admission to the combustion chamber as a single delivery, and at least over part of the operating load range of the engine controlling the fuel-gas ratio of said mixture during the period of delivery to obtain a predetermined fuel distribution in the combustion chamber at ignition.

7. A method as claimed in claim 6, wherein for each fuelling cycle of the engine part of the metered quantity of fuel is introduced to the gas prior to the commencement of delivery of the fuel-gas mixture, and the balance of the metered quantity of fuel is introduced to the gas during said delivery of the fuel-gas mixture.

8. A method as claimed in claim 6 or 7, wherein the metered quantity of fuel is delivered into a scheduling chamber containing gas to form the fuel-gas mixture, a first part of said metered quantity of fuel being delivered into the scheduling chamber prior to commencing delivery of the fuel-gas mixture to the engine, and the balance of the metered quantity of fuel is delivered into the scheduling chamber during delivery of the fuel-gas mixture to the engine.

9. A method as claimed in claim 6 or 7, wherein the control is arranged so that the fuel/gas ratio of the fuel-gas mixture during the latter portion of delivery thereof to the combustion chamber is not less than during the remainder of the delivery for the particular fuelling cycle.

10. A method as claimed in claim 6 or 7, wherein the control of fuel-gas ratio is such that at ignition the fuel-gas ratio in the combustion chamber at the ignition location is about stoichiometric.

11. A method as claimed in claim 1, 2, 3, 4, 6 or 7, wherein the control of the fuel-air ratio of the mixture is effected over the low load portion of the engine load range.

12. A method of injecting fuel to the induction system of an internal combustion engine comprising introducing a metered quantity of fuel into a scheduling chamber, selectively communicating the scheduling chamber with the induction system in timed relation to the engine cycle, supplying gas to the scheduling chamber at a pressure above the pressure in the induction system during said communication to deliver a fuel-gas mixture thereto, and over at least part of the engine load range controlling during respective engine cycles the introduction of the fuel to the scheduling chamber in relation to the period of communication of the scheduling chamber with the induction system to achieve a predetermined fuel distribution in the combustion chamber at ignition.

13. A method as claimed in claim 12, wherein for each cycle of the engine part of the metered quantity of fuel is introduced to the gas prior to the commencement of delivery of the fuel-gas mixture and the balance of the metered quantity of fuel is introduced to the gas during said delivery of the fuel-gas mixture.

14. A method as claimed in claim 12, wherein the metered quantity of fuel is delivered into said scheduling chamber while the chamber contains gas to form the fuel-gas mixture, a first part of said metered quantity of fuel being delivered into the scheduling chamber prior to commencing delivery of the fuel-gas mixture to the engine, and the balance of the metered quantity of fuel is delivered into the scheduling chamber during delivery of the fuel-gas mixture to the engine.

15. A method of delivering fuel to a spark ignited internal combustion engine comprising introducing air to a combustion chamber to support combustion of fuel, introducing a metered quantity of fuel into a body of gas to provide a fuel-gas mixture independent of the induced air, admitting said fuel-gas mixture to the combustion chamber in timed relation to the engine cycle, and controlling the introduction of the fuel to the gas during each engine cycle and as the fuel-gas mixture is delivered to the engine to obtain a predetermined fuel distribution in the combustion chamber at ignition over at least part of the load range of the engine.

16. A method of delivering fuel to an engine as claimed in claim 15 wherein the fuel-gas mixture is admitted to the air as the air is being introduced to the combustion chamber.

17. A method of delivering fuel to an engine as claimed in claim 16 wherein the fuel-gas mixture is admitted directly into a combustion chamber of the engine.

18. An internal combustion engine having a combustion chamber in which fuel is ignited and burnt, metering means for introducing a metered quantity of fuel into a body of gas to provide a fuel-gas mixture, admitting means for admitting the fuel-gas mixture to the combustion chamber in timed relation to the engine cycle, and control means for over at least part of the engine load range controlling during respective engine cycles the introduction of fuel to the gas as the fuel-gas mixture is delivered to the combustion chamber to obtain a predetermined fuel distribution in the combustion chamber at ignition.

19. A spark ignited internal combustion engine having a combustion chamber in which fuel is ignited and burnt, metering means for introducing a metered quantity of fuel into the body of gas to provide a fuel-gas mixture, delivery means for delivering said fuel-gas mixture to the combustion chamber as a single delivery for each fuelling cycle of the combustion chamber, and control means for over at least part of the operating load range of the engine controlling the fuel-gas ratio of the mixture during the period of delivery to the combustion chamber to obtain a predetermined fuel distribution in the combustion chamber at ignition.

20. An automotive vehicle including the engine of claim 18 or 19.

21. A fuel injector for injecting fuel into the induction system of an internal combustion engine having a combustion chamber in which fuel is ignited and burnt, comprising a scheduling chamber, metering means for introducing a metered quantity of fuel into the scheduling chamber, communication means for selectively communicating the scheduling chamber with the induction system in timed relation to the engine cycle, supply means for supplying gas to the scheduling chamber at a pressure above the pressure in the induction system during the communication of the scheduling chamber with the induction system to deliver a fuel-gas mixture thereto, and control means for over at least part of the engine load range controlling during the respective engine cycles the introduction of the fuel to the scheduling chamber in relation to the period of communication of the scheduling chamber with the induction system for achieving a predetermined fuel distribution in the combustion chamber at ignition.

22. An internal combustion engine including the fuel injector of claim 21.

23. An outboard marine engine including the fuel injector of claim 21.

* * * * *